United States Patent [19]

Barnett et al.

[11] Patent Number: 5,016,336
[45] Date of Patent: May 21, 1991

[54] DEVICE FOR FIXING BUNDLE OF ELONGATE MEMBERS HAVING NON-CYLINDRICAL OUTER SURFACE TO A SUPPORT

[75] Inventors: Barry R. M. Barnett; Richard E. Wiffin, both of Aylesbury, England

[73] Assignee: TRW United-Carr Limited, Buckinghamshire, England

[21] Appl. No.: 347,991

[22] Filed: May 5, 1989

[30] Foreign Application Priority Data

May 23, 1988 [GB] United Kingdom ................ 8812183

[51] Int. Cl.$^5$ ............................................. B25B 27/14
[52] U.S. Cl. ................................. 29/281.5; 29/281.6; 269/131; 248/74.2
[58] Field of Search ..................... 29/453, 281.5, 281.6, 29/281.1; 269/43, 126, 127, 128, 129, 130, 131, 132; 100/16; 414/745.1, 757, 777, 782, 788.1, 908, 910; 248/68.1, 71, 74.2, 74.1

[56] References Cited

U.S. PATENT DOCUMENTS

| Re. 29,037 | 11/1976 | Caveney et al. | 269/131 |
| 1,333,179 | 3/1920 | Lewis | 414/745.1 X |
| 3,851,869 | 12/1974 | Damewood | 269/127 X |
| 4,029,277 | 6/1977 | Bulanda | 269/131 X |
| 4,961,554 | 10/1990 | Smowton | 248/68.1 |

FOREIGN PATENT DOCUMENTS 534054 9/1931 Fed. Rep. of Germany ........ 269/43

Primary Examiner—Joseph M. Gorski
Assistant Examiner—Peter Dungba Vo
Attorney, Agent, or Firm—Fay, Sharpe, Beall, Fagan, Minnich & McKee

[57] ABSTRACT

A device 10 is provided for fixing a bundle of elongate members 14–18 to a support. The device comprises a locating member 20 which is locatable non-rotatably on the bundle, and a mount 22 adapted to be mounted on the support. The locating member is rotatably fitted to a body 36 of the mount such that the angular orientation of the locating member with respect to the mount can be adjusted to suit the orientation of the bundle to the surface to which it is to be fixed. Additionally, the locating member is movable relative to the mount in the through direction of the device.

6 Claims, 4 Drawing Sheets

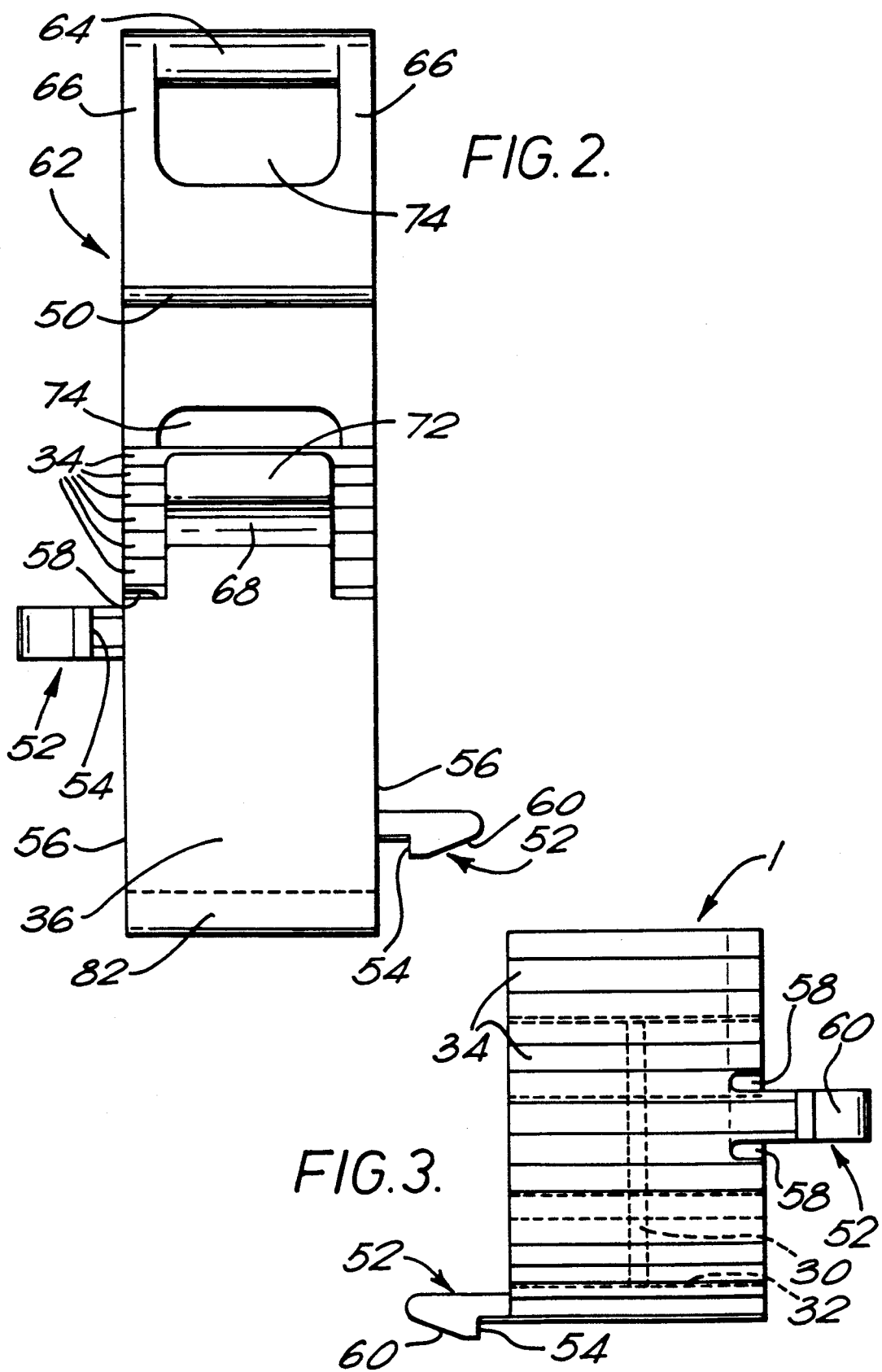

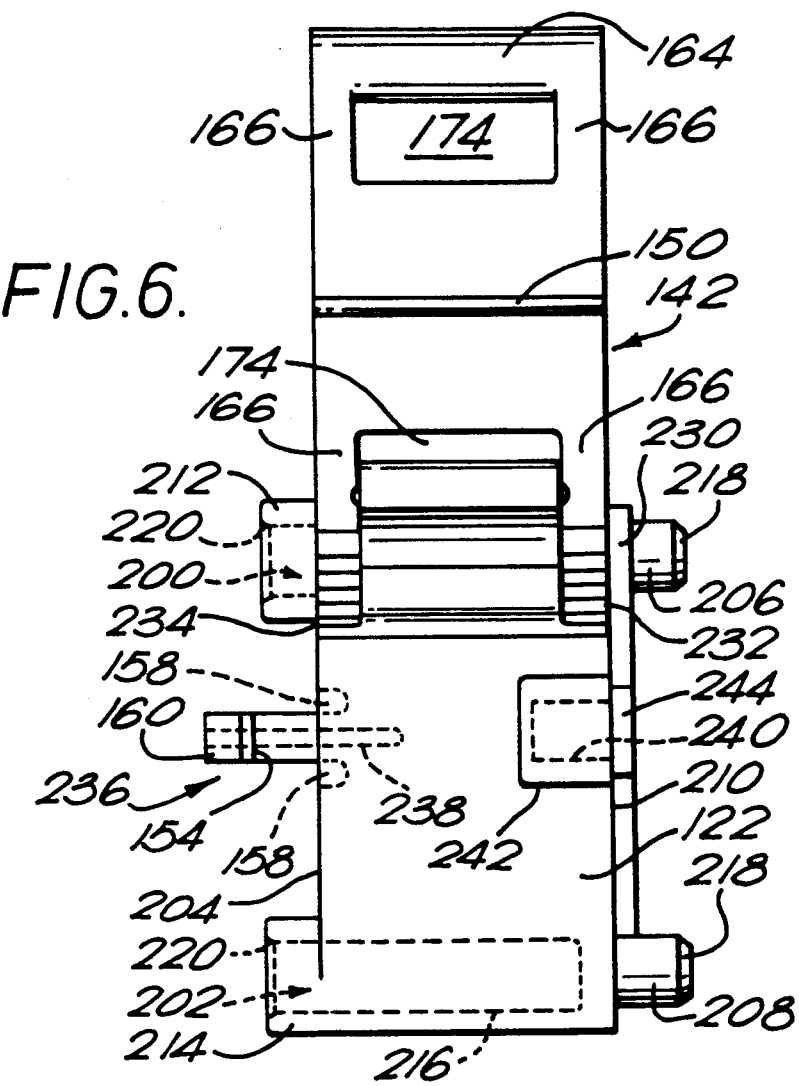
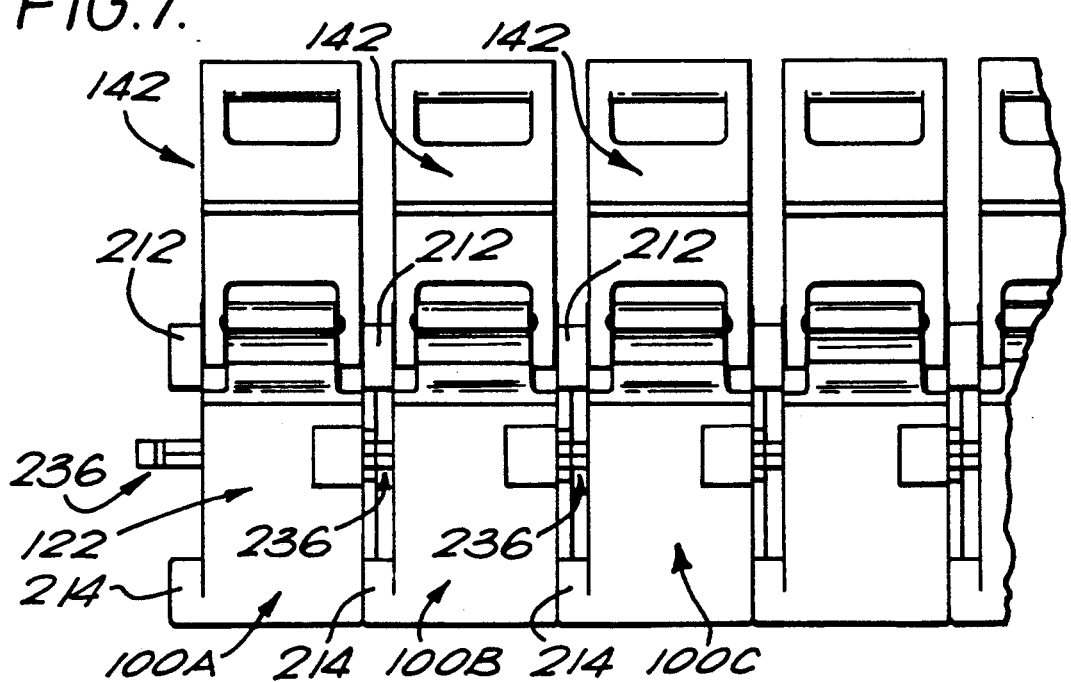

DEVICE FOR FIXING BUNDLE OF ELONGATE MEMBERS HAVING NON-CYLINDRICAL OUTER SURFACE TO A SUPPORT

BACKGROUND OF THE INVENTION

This invention relates to fixing a bundle of elongate members or an elongate element having a non-cylindrical outer surface to a support.

In order to facilitate the fixing of a bundle of elongate members, such as pipes, to a support, it is desired to prefit a plurality of fixing devices to the bundle along the length thereof such that after the bundle has been offered to the support it is only necessary to fasten the devices thereto. Such a procedure is particularly advantageous where the support is provided with pre-fitted fastening means to which the devices are readily securable, for example by merely being pushed thereonto. It will be appreciated that when such pre-fitted fastening means are provided the method of fixing can be performed by robotics.

A problem arises in the above-mentioned procedures in fitting the fixing devices so that they will be accurately orientated with respect to the support therefor, especially where the support is provided with pre-fitted fastening means onto which the devices are to be push-fitted. It will be appreciated in this connection that the same problem does not arise where a single pipe, or other elongate member or element, having a cylindrical outer surface is to be mounted since in such a case the device will include a cylindrical or part-cylindrical through-passage for locating the pipe and will be rotatable with respect to the pipe. However, where a bundle of pipes are to be mounted, the through-passage therefor will be configured to the cross-section of the bundle and preclude rotation of the device relative to the bundle once fitted thereto. The same problem also arises in relation to the fixing of a single elongate element, having a non-cylindrical outer surface.

SUMMARY OF THE INVENTION

In order to overcome the above-mentioned problem, the present invention generally provides a device for fixing a bundle of elongate members or an elongate element having a non-cylindrical outer surface to a support, said device comprising a locator which is locatable non-rotatably on the bundle or element, and a mount adapted to be mounted on the support, to which mount the locator is rotatably fitted, such that the angular orientation of the locator with respect to the mount can be adjusted to suit the orientation of the bundle or element to the surface to which it is to be fitted.

In one aspect of the present invention there is provided a device as defined in the last preceding paragraph, in which the locator is provided with a circumferentially extending array of rounded ribs snap-engageably cooperable with circumferentially spaced apart ribs on the mount for retaining the locator in a selected one of a plurality of predetermined angular positions relative to said mount.

In another aspect of the invention, there is provided a device as defined in the last but one preceding paragraph, in which the mount is provided with interconnecting means whereby a plurality of said devices can be interconnected side-by-side to form a cartridge of said devices.

Both aspects may be incorporated in the same device.

The locator may comprise a locating member provided with a through-passage for non-rotably locating the bundle or element, which through-passage has an opening transverse its through direction such that the locating member is fittable transversely onto said bundle or element.

The mount is preferably provided with a through-aperture which is generally cylindrical, and in which said locating member is rotatably received.

In the embodiment to be described hereinafter, the mount comprises a body provided with a through-recess, which is generally part-cylindrical and which is open transverse its through direction at a mouth extending at least the angular extent of said opening of the through-passage of the locating member, and a closure member fittable across the mouth to close said recess to form said through-aperture. In these embodiments the angular extent of the mouth is such as to allow the locating member to be moved transversely into and out of said recess through said mouth.

In these embodiments, said locating member has an outer wall which extends cylindrically apart from discontinuity at said opening of its through-passage and which is provided with said array of ribs, and wherein said through-recess of said body and closure member fittable across the mouth thereof are provided with said circumferentially spaced apart ribs, which ribs are circumferentially spaced such that at least two such ribs are engaged with the array of ribs in any selected one of a plurality of predetermined angular positions of the locating member relative to mount over 360°.

The locating member may be movable in the through direction of its through-passage relative to said body and may be fittable into and removable from the through-recess of said body by such movement. In this case said locating member may comprise abutment means for limiting its movement in the through direction relative to said body, the abutment means on at least one side of the locating member being deflectable to allow fitting and removal of the locating member.

In one embodiment, the abutment means comprises fixed circumferentially extending radial flange means on one side of the locating member and at least one deflectable abutment member on the other side thereof.

The interconnecting means referred to above may comprise at least one socket and spigot aligned therewith formed on opposite sides of the mount, the or each aligned socket and spigot having substantially corresponding cross-sections.

Thus, for example, the mount may have at least two sockets formed on one side thereof and respective aligned spigots formed on the other side thereof.

The invention also includes a bundle of elongate members provided with a plurality of devices as defined in the preceding paragraphs for fixing said bundle to a support.

The invention also includes a method of fixing a bundle of elongate members or an elongate element having a non-cylindrical outer surface to a support, comprising pre-fitting a plurality of devices as defined above to the bundle or element along the length thereof, offering the bundle or element to the support and adjusting the position of the mount relative to the locator of each device to enable the mount to be mounted on said support.

Preferably the support is provided with prefitted fastening means such as projecting studs, on which said mounts locate.

BRIEF DESCRIPTION OF THE DRAWINGS

In order that the invention may be well understood, the above-mentioned presently preferred embodiment will now be described, by way of example only, with reference to the accompanying drawings, in which:

FIG. 2 is an end view of the same device taken in the direction of arrow II in FIG. 1;

FIG. 3 is an end view of a locating member of the device taken in the direction of arrow III in FIG. 1;

FIG. 6 is an end view of the device shown in FIG. 4 taken in the direction of arrow VI; and FIG. 7 shows a plurality of devices as shown in FIG. 4 interconnected to form a cartridge.

DETAILED DESCRIPTION OF THE PREFERRED EMBODIMENT

Figure 1:
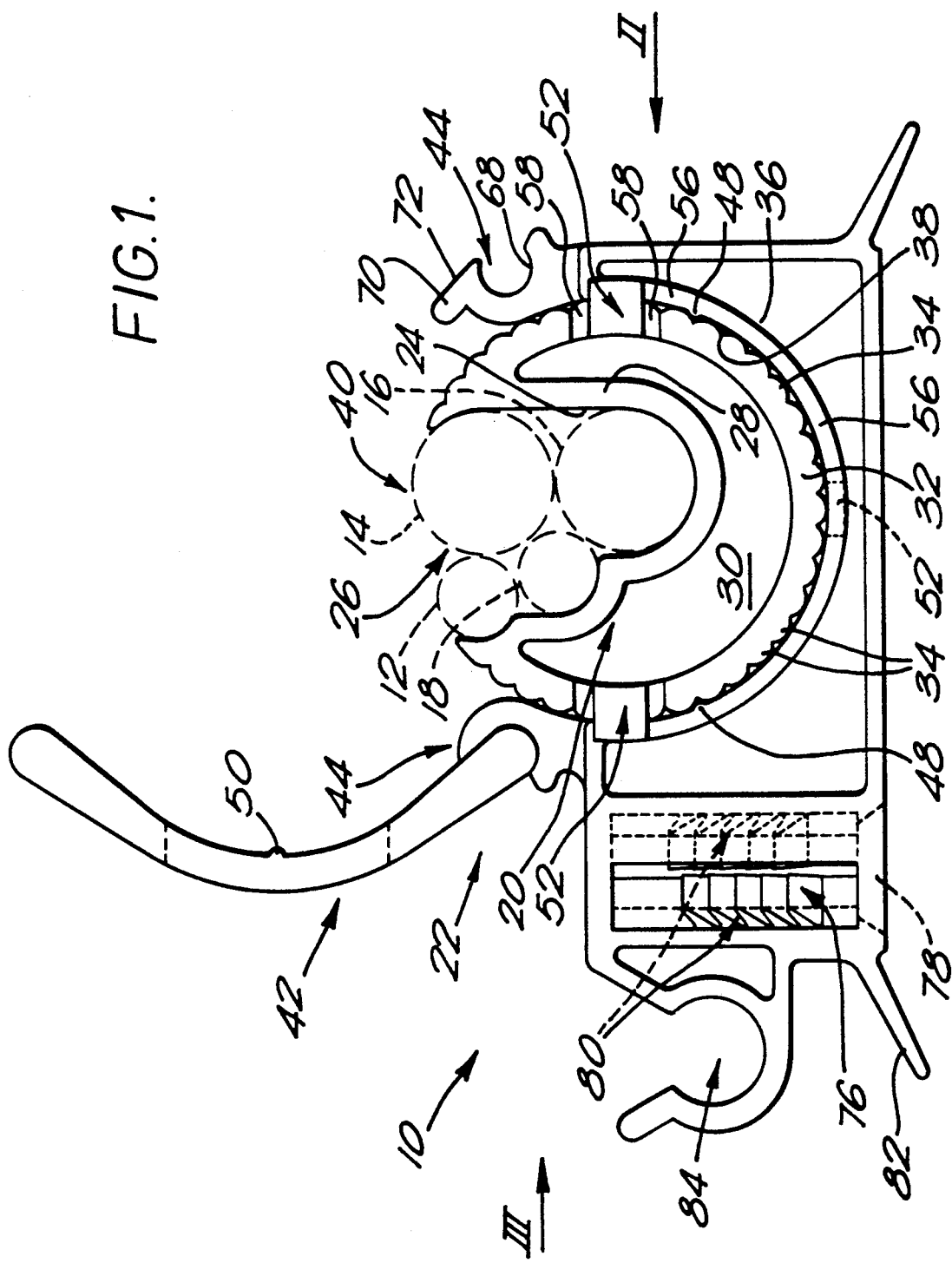
FIG. 1 is a side view of a device for fixing a bundle of pipes to a support.

The device 10 illustrated in FIGS. 1 and 2 is configured to mount a bundle of four pipes 12, 14, 16, 18 shown in dotted line in FIG. 1 to a support (not shown). To this end, the device 10 comprises a locator 20 which is locatable non-rotatably on the bundle and a mount 22 adapted to be mounted on the support, to which mount the locator is rotatably fitted such that the orientation of the locator with respect to the mount can be adjusted.

The locator 20, which is shown separately from the mount in FIG. 3, comprises a locating member formed of a plastics material such as a polypropylene which is provided with a through-passage 24 configured to non-rotatably locate the bundle and provided with an opening 26 transverse its through direction such that the locating member is fittable transversely onto the bundle of pipes. Thus, as illustrated the through-passage 24 is defined by a wall 28 which has part-cylindrical portions configured to locate corresponding portions of the pipes. The wall 28 is supported by a transverse web 30 on an outer wall 32 which extends parallel to the wall 28 in the through direction of passage 24. The wall 32 extends cylindrically apart from its discontinuity at the opening 26 and is provided with a circumferentially extending array of rounded external ribs, or serrations, 34 which enable the locating member to be retained in a plurality of predetermined angular positions relative to the mount 22 as will be described in greater detail hereinafter.

The mount 22 comprises a body 36 provided with a through-recess 38 which is generally part-cylindrical, being open transverse its through direction at a mouth 40, and a closure member 42 fittable across the mouth 40 on lugs 44 provided to each side of the mouth to close the recess 38. The body 36 and closure member 42 are each formed of a plastics material, such as a polyoxy methylene. The through-recess 38 is provided with a plurality of ribs 48 (here shown as two) which are arranged to cooperate with the ribs 34 on the locating member in a snap-engagable manner to retain the locating member in a predetermined angular position relative to the mount unless these components are subjected to relative torque above a predetermined amount when the locating member will rotate relative to the mount. In the illustrated embodiment the locating member is rotatable through 360° in the mount in the generally cylindrical through-aperture formed by the through-recess 38 when closed by the closure member 42. The closure member 42 is provided with a rib 50, similar to the ribs 48 for cooperable snap-engagement with the ribs 34 on the locating member on rotation of the locating member from the illustrated position in FIG. 1 to a position where one of the ribs 48 is opposite the opening 26 of the through passage 24 to maintain the engagement of at least two ribs 48 or 50 with the ribs 34 at all times, therefore maintaining a minimum degree of retention of the locating member against relative rotation to the mount. In the embodiment this is achieved by providing the ribs 48, 48 and 50 at 120° spacing and ensuring that the angular extent of the opening 26 is less than 120°.

The locating member 20 is also movable in the through direction of its through-passage relative to the mount. Further, the locating member can be fitted into and removed from the mount by such movement. Fitting and removal in this manner is further facilitated if the closure member is not fitted across the mouth since the mouth can then be deformed open.

The locating member is provided with abutments 52 for limiting its movement in the through direction relative to the mount. As illustrated, two such abutments project from one side of the locating member at diametrically opposed locations and a further abutment projects from the other side of the locating member equi-spaced from the locations of the other two abutments. Each abutment is provided with an abutment surface 54 which is engagable with a respective side surface 56 of the body 20 adjacent the through-recess 38 thereof. As will be appreciated from FIG. 2 the arrangement is such that a predetermined amount of relative movement of the locating member relative to the mount body is possible.

Each abutment 52 is attached to the locating member in such a way as to be deflectable relative thereto to enable the locating member to be fitted into or removed from the recess 38 as outlined above. Specifically apertures 58 in the wall 32 are located on each side of each abutment at its connection with the wall. To provide automatic deflection on fitting, each abutment 52 is provided with a tapered nose portion 60 which will engage with and ride up the edge between the surface defining the through-recess 38 and the side surface 56 on the side of the recess through which the locating member is introduced. It will be appreciated that the illustrated arrangement enables the locating member to be fitted into or removed from the recess 38 from either side of the body 36 thus facilitating assembly and disassembly of the device. However, it will be understood that the device can still be assembled and dis-assembled in this way if the abutment(s) on only one side of the locating member is(are) deflectable.

In the embodiment, the angular extent of the mouth 40 of the through-recess 38 is such as to allow the locating member 20 to be moved transversely into and out of the recess through the mouth to fit the locating member into the recess 38 or remove it therefrom, thus providing an alternative method of assembling and disassembling the fitting. The angular extent of the mouth 40 can be less than 180°, as illustrated, because of the resilience of the body and locating member allowing each to be deformed on relative movement of the locating member through the mouth of the body. The angular extent of the mouth can be even smaller where it is not required to have the possibility of fitting the locating member into the recess 38 or removing it therefrom through the mouth 40. However, the mouth should have at least the same angular extent as the opening 26 of the through-passage 24 of the locating member to enable the body to be fitted transversely onto the bundle either separately from the locating member prior to assembly of the locating member and body or after such assembly.

The closure member 42 has the same width as the body 36, as illustrated in FIG. 2, and generally comprises a strip 62, which is bifurcated at each end. A crosspiece 64 extends between the two prongs 66 of each bifurcated end and the rib 50 extends transversely across the strip intermediate these ends. The cross pieces 64 are cylindrical and snap-fittable into part cylindrical recesses 68 provided in the lugs 44 located on each side of the mouth of the body 36. A tab 70 provided on each lug 44 facilitates snap engagement and disengagement of an end of the closure member to the lug. During snap engagement, the crosspiece 64 rides over the surface 72 of the tab and the tab can be manipulated to open the recess 68 to facilitate disengagement of a crosspiece therefrom. In the illustrated embodiment, in which the closure member is snap fittable to both lugs 44, each lug has such a tab, and the tabs are located in the openings 74 between the prongs of the ends of the strip 62 when the strip is fitted to the lugs 44.

In the illustrated embodiment, the body 36 is provided with a female push-on connection, generally indicated at 76, for a threaded stud (not shown). The connection comprises a generally cylindrical aperture having an entrance end 78 and provided with two opposed series of resiliently deflectable ribs 80 extending away from the entrance such that when the connection is pushed on to a suitable threaded stud the ribs interengage with the thread. The body is provided with two depending flexible fingers 82 which are resiliently deformed by the support from which the stud projects when the mount 22 is mounted on the support by the female connection 76 being pushed-on the stud. This resilient deformation of the fingers biases the body 36 away from the support and thus the ribs 80 into gripping engagement with the stud thereby enhancing retention of the mount on the stud.

As illustrated, the body 36 is provided with a socket retaining portion 84 for optionally retaining a single pipe in parallel relationship to the bundle of pipes.

A plurality of devices as described above can be used for mounting a bundle of pipes 12, 14, 16 and 18 to a support provided with pre-fitted projecting studs at predetermined locations by the use of robotics. Firstly, the devices are assembled into a condition as shown in FIG. 1 and then fitted transversely onto the bundle at locations which correspond approximately to the spacing of the studs. The closure members of the devices are then positioned to close the mouth 40 of the through-recess 38 and the assembly is offered to the support. The mounts of the devices are able to move relative to the locating members and accordingly can adjust to the correct position for push-fitting on the studs. Any misalignment in the through direction of the locating members can be taken up by firstly movement of the locating member in that direction relative to the mount and if necessary by movement of the whole of the device on the bundle. The pipes can be removed from the devices after the mounts have been fitted to the studs by merely unfastening the closure members 42 if the opening 26 of the through-passage of the locating member and the mouth 40 of the through-recess of the mount body are aligned. If they are not it is also necessary to remove the locating member from the body either by moving it through the mouth 40 or by movement in the through direction of its through-passage as described above.

Figure 4:
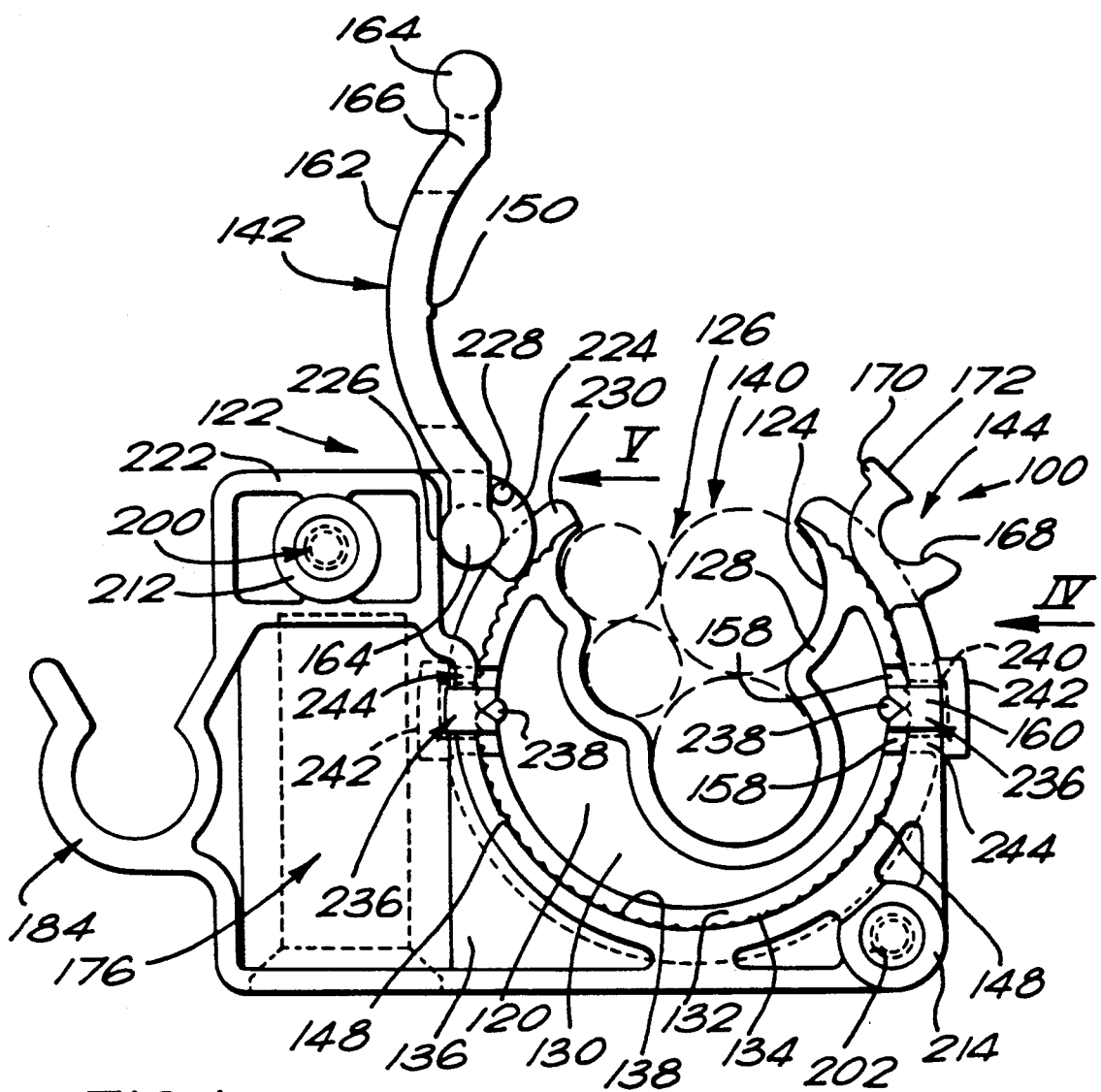
FIG. 4 is a side view of another device for fixing a bundle of pipes to a support.
Figure 5:
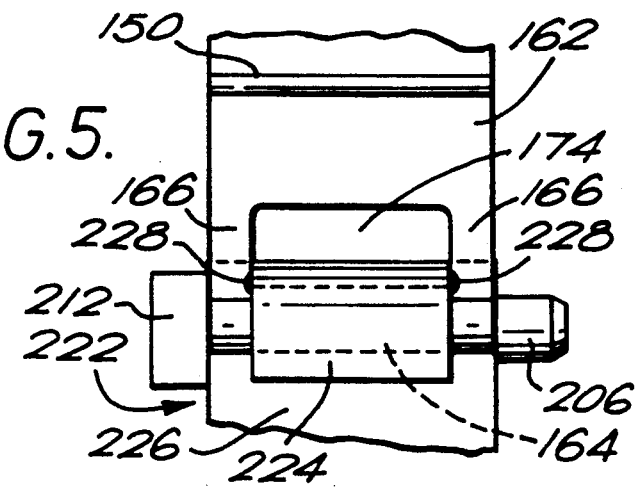
FIG. 5 is a fragmentary view of a mount of the device shown in FIG. 4 taken in the direction of arrow V therein.

The device 100 illustrated in FIGS. 4 to 6 is generally similar to the device 10 illustrated in FIGS. 1 and 2 and parts of the device 100 corresponding to substantially similar parts of the device 10 have been given like reference numerals increased by 100. Thus the device 100 comprises a locator 120 (corresponding to locator 20 of device 10) which is locatable non-rotatably on a bundle of pipes and a mount 122 (corresponding to mount 22 of device 10) which is adapted to be mounted on a support, the locator being rotatably fitted to the mount such that the orientation of the locator with respect to the mount can be adjusted. Further description of the parts of the device 100 corresponding to parts of the device 10 and their function is omitted to avoid unnecessary duplication.

The device 100 differs from the device 10 primarily in that the mount 122 is provided with interconnecting means whereby a plurality of devices 100 can be interconnected side-by-side to form a cartridge of said devices as illustrated in FIG. 7. This interconnecting means comprises at least one socket and spigot aligned therewith formed on opposite sides of the mount, the or each aligned socket and spigot having substantially corresponding cross-sections. As illustrated, the mount 122 has two sockets 200, 202 formed on one side 204 thereof and respective aligned spigots 206, 208 formed on the other side 210 thereof. The sockets 200 and 202 are formed in bosses 212, 214 projecting from the side 204 of the mount and extend into the mount as indicated by dotted line 216 in relation to socket 202. The leading ends of the spigots 206 and 208 are chamfered as indicated at 218 to facilitate reception of the spigots in the sockets, and furthermore the mouths of the sockets include a frusto-conical lead-in portion 220 to further facilitate reception of the spigots in the sockets. The two sockets are located on diagonally opposite portions of the body 136 of the mount 122, the boss 212 for the socket 200 extending from a portion 222 of the body adjacent the blind end of the female push-on connection 176.

The body portion 222 also carries a hook member 224 which defines a recess with a wall 226 of body portion 222 into which the crosspiece 164 at one end of the closure member 142 is snap-fitted. The hook member 224 extends through the opening 174 between the prongs 166 at that end of the strip 162 of the closure member and is provided on its two side walls with pips 228 which are located to temporarily retain the closure member in a fully opened position as shown in FIG. 4 to assist fitting of the device transversely onto a bundle of pipes.

As will be clear from FIG. 4, the other end of the closure member is snap-fittable to a lug 144 to close the mouth 140 of the through-recess 138 of the body 136.

As with the device 10, in the device 100, the locating member 120 is movable in the through direction of its through-passage 124 relative to the mount 122. Further, the locating member 120 can be fitted into and removed from the mount by such movement. Abutment means are also provided for limiting movement of the locating member in the through direction relative to the mount. These abutment means comprise a fixed circumferentially extending radial flange means 230 on one side 232 of the locating member 120 and at least one deflectable abutment member on the other side 234 thereof. As illustrated, two such deflectable abutment members 236 are provided on side 234 of the locating member. Each abutment member 236 corresponds substantially to an abutment 52 of device 10 and like parts of the abutment members 236 have been given corresponding reference numerals increased by 100.

The abutment members 236 differ from abutments 52 in that they are provided with a strengthening rib 238 along their length opposite to their tapered nose portions 160.

The body 136 of the mount 122 is provided with diametrically opposed recesses 240 for receiving the abutment members 236 of an adjacent device 100 when a plurality of such devices are interconnected in side-by-side relationship to form the cartridge of FIG. 7. Each recess 240 is defined within a respective pad 242 formed on the body 136. The flange means 230 are discontinuous at locations 244 to allow entry of the abutment members into the recesses 240 when the locating member is located relative to the body as indicated in FIG. 4. Thus, when a plurality of devices 100 are interconnected in side-by-side relationship to form the cartridge of FIG. 7, the opening 126 of the through-passage 124 of the locating member is aligned with the mouth 140 of the through-recess 138 of the mount body 136. Of course, after a device 100 has been separated from the cartridge, the locating member may be rotated relative to the mount body to a position where the flange means 230 extend across the recesses 240.

It will be noted that the device 100 also differs from the device 10 in that the wall 128 is configured differently to the wall 28 on the right-hand side of the devices as viewed in FIGS. 1 and 4. However, it is to be understood that the configuration of the wall 128 or 28 may differ from that illustrated depending on the number and size of pipes to be located in the locating member.

The cartridge of a plurality of devices 100 illustrated in FIG. 7 may comprise any predetermined number of devices 100, for example typically twenty such devices would be provided in a cartridge. It will be understood that the provision of a cartridge of a plurality of devices 100 is particularly useful when robotics are utilized for fitting the devices to a bundle of pipes since the devices are held in a predetermined orientation by the cartridge and are readily separated therefrom.

It will be understood that in the cartridge illustrated in FIG. 7, each device intermediate the two end devices thereof is interconnected side-by-side with the adjacent devices by means of its sockets 200, 202 and spigots 206, 208. Thus, referring to FIG. 7 the spigots 206 and 208 of the device referenced 100A are received in the sockets 200, 202 of the device referenced 100B, and the spigots 206, 208 of that device are received in the sockets 200, 202 of the device referenced 100C. Additionally, the abutment members 236 of device 100B are received in the recesses 240 of device 100A and the abutment members 236 of device 100C are received in the recesses 240 of device 100B.

We claim:

1. A device for fixing elongate members having a non-cylindrical outer surface profile to a support surface, said device comprising a locator means for being non-rotatably located on the elongate members, and a mount means adapted to be mounted on the support surface, connecting means joning said locator means to the mount means for permitting the angular orientation of the locator means with respect to the mount means to be adjusted to adjust the angular orientation of the elongate members relative to the support surface, the connecting means including a circumferentially extending array of rounded ribs provided on said locator means and spaced apart ribs provided on the mounted means, said rounded ribs being snap-engageably cooperative with said spaced apart ribs for retaining the locator means in a selected one of a plurality of predetermined angular positions relative to said mount means, the locator means further comprising a locating member provided with a through-passage for non-rotatably locating the elongate members, the through-passage having an opening transverse its through direction such that the locating member is fittable transversely onto said elongate members, said mount means comprising a body provided with a recess in which said locating member is rotatably received, said recess extending through said body and defining a through axis, said recess further being generally part-cylindrical and having an opening transverse to the through axis and terminating in a laterally open mouth, a closure member fittable across the mouth to close said opening, and the size of the mouth is such as to allow the locating member to be moved transversely into and out of said recess through said mouth.

2. The device as claimed in claim 1 wherein said locating member has a generally cylindrical outer wall which is provided with said array of ribs, and wherein said recess extending through said body provided with said circumferentially spaced apart ribs, the spaced apart ribs being circumferentially spaced such that at least two such ribs are engaged with the array of rounded ribs in any selected on of a plurality of predetermined angular positions of the locating member relative to the mount means.

3. The device as claimed in claim 1 wherein said mount means is provided with interconnecting means whereby a plurality of said devices can be interconnected side-by-side to form a cartridge of said devices.

4. The device as claimed in claim 1 wherein the locating member is movable in the through direction of its through-passage relative to said body and is fittable into and removable from the recess of said body by such movement.

5. The device as claimed in claim 4 wherein said locating member comprises abutment means for limiting its movement, the abutment means including a deflectable portion to allow fitting and removal of the locating member.

6. The device as claimed din claim 5, wherein said abutment means further includes a a fixed circumferentially extending radial flange means.

* * * * *